United States Patent [19]
Riccardi et al.

[11] Patent Number: 5,298,550
[45] Date of Patent: Mar. 29, 1994

[54] MOLDING COMPOSITIONS BASED ON POLYESTER

[75] Inventors: Nunzio Riccardi; Nicola De Mattia; Armando Mariano, all of Matera; Aldemaro Ciaperoni, Bollate, all of Italy

[73] Assignee: ECP Enichem Polimeri S.r.l., Milan, Italy

[21] Appl. No.: 831,181

[22] Filed: Feb. 5, 1992

[30] Foreign Application Priority Data

Feb. 6, 1991 [IT] Italy .................. MI 91 A 000305

[51] Int. Cl.$^5$ .............................................. C08L 67/00
[52] U.S. Cl. ...................... 524/513; 524/452; 524/493; 524/494; 524/296; 524/297; 524/605
[58] Field of Search ............. 524/513, 494, 493, 451, 524/452, 296, 297, 605

[56] References Cited

U.S. PATENT DOCUMENTS

| | | | |
|---|---|---|---|
| 4,344,874 | 8/1982 | Akagi et al. | 524/296 |
| 4,352,904 | 10/1982 | Deyrup | 524/292 |
| 4,365,036 | 12/1982 | Lee | 524/299 |
| 4,429,067 | 1/1984 | Barenberg | 524/299 |
| 4,440,889 | 4/1984 | Hergenrother | 524/143 |
| 4,558,085 | 12/1985 | Lee | 524/299 |
| 4,810,744 | 3/1989 | Light | 524/494 |

FOREIGN PATENT DOCUMENTS 0371753 6/1990 European Pat. Off. .
2075031A 11/1981 United Kingdom .

OTHER PUBLICATIONS

World Patents Index Latest, Derwent Publications Ltd., London, GB; AN 90-181503 & JP-A-2 117 951, (Asahi Chemical Ind. K.K.), May 2, 1990.

Primary Examiner—Paul R. Michl
Assistant Examiner—John J. Guarriello
Attorney, Agent, or Firm—Oblon, Spivak, McClelland, Maier & Neustadt

[57] ABSTRACT

Molding compositions having high rates of crystallization and suitable for being molded at a temperature of the mold not higher than 100° C. to produce molded articles having an optimal combination of mechanical, physical, thermal properties and of surface appearance, comprising: a linear saturated polyester (A); a salt of a mono- or poly-carboxylic acid (B); an ionomer copolymer containing side carboxylic groups at least partially salified (C), and a solid inert inorganic substance (D) having a particle size not higher than 5 micrometers. Said compositions may be reinforced by reinforcing materials, preferably by glass fibers.

16 Claims, 1 Drawing Sheet

MOLDING COMPOSITIONS BASED ON POLYESTER

The present invention relates to molding compositions based on polyester.

More particularly, the present invention relates to molding compositions based on polyester, optionally reinforced, having high rates of crystallization and particularly suitable for being molded at low temperature of the mold to produce molded articles having an optimal combination of mechanical, physical, thermal properties and of surface appearance.

Saturated linear thermoplastic polyesters, such as polyethylene-terephthalate (PET), its blends and copolymers, are well known on the market and produced on a large scale at comparatively low costs and show, in their crystalline state, excellent physical and mechanical properties, consistent with their high melting points.

In order to improve the mechanical properties of the molded articles obtained from said thermoplastic polyesters, it is a conventional technique to add to the resin reinforcing materials such as, for example, glass fibers, asbestos fibers, carbon fibers, crystalline aromatic polyamide fibers, and/or high modulus acrylic fibers.

The commercial development of these saturated linear polyesters, as molding material for use in injection technology, has been, however, hampered because the cycle time for molding of finished articles is somewhat longer than that one used for other engineering polymers.

This is primarily due to the fact that the molded articles based on polyester do not reach a crystalline state as rapidly as it occurs in the molded articles obtained by other engineering polymers. On the other hand, the premature ejection from the mould of an article which has not been sufficiently crystallized would mean a further crystallization in the time causing a change in the volume and a possible distortion of the shape of the article.

A further disadvantage of PET, either as such or reinforced, is that it requires the molds to be maintained at a temperature higher than 100° C. in order to achieve molded articles having dimensional stability and a good surface appearance.

In fact, the crystallization rate of PET at a temperature lower than 100° C., is so low that it is not possible to obtain molded articles with satisfactory results.

While good surface characteristics can be obtained at molding temperatures of 130° C. or more, the use of such temperatures is not practical in the molding field; since most molds are heated with water and can attain temperatures not higher than 100° C.

Additives are known in the art, generally called nucleating agents, which allow to suitably increase the melt crystallization rate of the polyesters; however, these known additives only slightly influence the lowest limit of the mold temperature.

Said limit, in fact, is correlated both to the peak of crystallization during the heating (Tch) and to the peak of crystallization during the cooling (Tcc), both the peaks determined by using a differential calorimeter which peaks, for unmodified PET, have their maximum at the temperatures of 135° C. and 208° C. respectively; while, in the presence of nucleating agents of saline type, such as sodium benzoate, sodium o-chloro-benzoate and the like, these temperatures are slightly varied to 130° C. and 212° C. respectively.

PET compositions containing the above mentioned nucleating agents are disclosed, for example, by U.S. Pat. No. 3,516,957; Japanese patent Nos. 71/029977 and 69/24349; German patent Nos. 2,014,770; 1,945,967; 1,945,101 and UK patent Nos. 1,282,679 and 1,315,695.

Substantially the same results are achieved also by adding to the PET copolymers consisting of an alpha-olefin and an ethylenically unsaturated carboxylic acid wherein the acid groups can be completely or partially neutralized with metal cations, as disclosed by U.S. Pat. Nos. 3,435,093 and 3,639,527 and French patent No. 2,051,638.

It is known that, in order to drastically influence the maximum crystallization temperatures (Tch) and (Tcc) of PET, as well as the glass transition temperature (Tg) of the amorphous phase, it is generally necessary to use plasticizers and/or comonomers, also polymeric, which are capable of rendering more flexible the polymer macromolecule.

The patent literature contains numerous examples of references describing the addition of conventional plasticizers alone or in admixture with a nucleating agent, to PET or, generally, to a saturated polyester. Generally, the plasticizing agent can be either a low molecular weight ester, such as dibenzoate of neo-pentyl glycol, di-benzoate of di-ethylene glycol, di-benzoate of triethylene glycol, tribenzoate of glyceryl and the like or a polyalkyleneglycol.

PET compositions containing the above mentioned plasticizers are disclosed, for example, by U.S. Pat. Nos. 4,440,889 and 4,344,874 and by Japanese patent No. 83/049747.

The addition of a nucleating agent combined with a plasticizing agent to PET is disclosed by many patents, among which we mention:

Japanese patent application No. 84/157144 disclosing compositions of PET with Na-stearate and polyethylene-glycol-lauryl-glycidyl-ether;

Japanese patent application No. 84/24747 relating to compositions of PET with an ethylene-methacrylic acid copolymer salified with Na in combination with polyethylene glycol dimethyl ether;

Japanese patent application No. 57/143384 relating to compositions of PET with polyethylene-glycol-diphthalate disodium salt;

U.S. Pat. No. 4,365,036 describing the use of a complex between NaI and polyethylene glycol, as modifier of PET;

U.S. Pat. No. 4,558,085 relating to the use of a complex between polyethylene glycol and sodium salts of aliphatic acids.

Particularly, U.S. Pat. No. 4,352,904 discloses a reinforced PET containing incorporated therein a sodium or potassium salt of a hydrocarbon acid containing between 7 and 25 carbon atoms, or a sodium or potassium salt of an organic polymer which contain pendant carboxyl groups and a low molecular weight organic compound which can be an ester, a ketone, a sulfone, a sulfoxide, a nitrile or an amide.

The presence, however, of a plasticizing agent and/or of an agent making the chain flexible in the PET involves some alteration of its peculiar properties such as the melting temperature, the thermal stability and, generally, the mechanical properties of the relevant molded articles; this alteration is as more noticeable as higher is the amount of added plasticizing agent.

The object of the present invention is to provide a composition based on a saturated linear thermoplastic polyester having high crystallization rate and suitable for being molded at a temperature of the mold not higher than 100° C. to produce molded articles having an optimal combination of mechanical, physical and thermal properties and of surface appearance.

The composition of the present invention allows to achieve the above mentioned characteristics by incorporating in the polyester resin (A): a salt of a mono- or poly-carboxylic acid (B); an ionomer copolymer containing side carboxylic groups at least partially salified (C), and a solid inert inorganic substance (D) having a particle size not higher than 5 micrometers.

The subject matter of the present invention is, therefore, the polyester compositions having a high crystallization rate, suitable for molding by using molds heated at a temperature not higher than 100° C. to originate molded articles having an optimal combination of mechanical, physical and thermal properties and of appearance, comprising:

A. a linear saturated polyester;
B. from 0.1 to 5% by weight, with respect to polyester A, of a salt of a mono- or poly-carboxylic acid;
C. from 1 to 20% by weight, with respect to polyester A, of an ionomer copolymer containing pendant carboxyl groups which are at least partially salified; and
D. from 0.01 to 1% by weight, with respect to polyester A, of a solid inert inorganic substance having particle size not higher than 5 micrometers.

Preferably, the polyester compositions at high crystallization rate of the present invention, comprise:

A. a linear saturated polyester having an intrinsic viscosity of at least 0.3 dl/g;
B. from 0.5 to 2% by weight, with respect to polyester A, of a salt of a mono- or poly- carboxylic acid containing from 7 to 25 carbon atoms;
C. from 2 to 10% by weight, with respect to polyester A; of an ionomer polymer containing pendant carboxyl groups which are at least partially salified; and
D. from 0.01 to 1% by weight, with respect to polyester A, of a solid inert inorganic substance having particle size not higher than 2.5 micrometers.

Tests carried out by the Applicants have shown that the combination of the above mentioned components B, C and D is much more effective than the single components, as far as the crystallization rate and the decrease of the peaks of crystallization temperature on heating (Tch) and on cooling (Tcc), are concerned. Furthermore, the compositions of the present invention can be molded by using conventional molds heated by water at temperatures preferably comprised between 50° and 85° C. and allow to obtain molded articles having an optimal combination of mechanical, physical, thermal properties and of surface appearance.

In addition, the polyester compositions of the present invention can also contain reinforcing material, such as glass fibers, asbestos fibers, carbon fibers, crystalline aromatic polyamide fibers, such as, for example, kevlar ®, and/or high modulus acrylic fibers. In this case, the concentration of the reinforcing material can vary between 0.1 and 150%, preferably between 10 and 100% by weight, with respect to the composition. The glass fibers, having a length comprised between 0.05 and 5 cm and a diameter comprised between 5 and 50 micrometers, are preferred as reinforcing material.

The linear saturated polyester A, used in the compositions of the present invention generally comprises all the linear saturated products obtained by polycondensation of a saturated aliphatic or cycloaliphatic glycol with a dicarboxylic acid or one of its reactive derivatives. Preferably, said polyester comprises the polycondensation products of aromatic dicarboxylic acids having from 8 to 14 carbon atoms and at least a glycol having the formula HO—(CH$_2$)$_n$—OH, wherein n is an integer comprised between 2 and 10, neopentyl glycol and cyclohexanedimethanol.

Up to 50% by moles of the dicarboxylic aromatic acids can be substituted by at least another different aromatic dicarboxylic acid having from 8 to 14 carbon atoms, and/or up to 20 % by moles of the dicarboxylic aromatic acids can be substituted by an aliphatic dicarboxylic acid having from 2 to 12 carbon atoms.

The preparation methods of these polyesters are well known and described, for example, in U.S. Pat. Nos. 2,465,319 and 3,047,539.

Examples of aromatic dicarboxylic acids are: terephthalic acid, isophthalic acid, dibenzoic acid, naphthalene-dicarboxylic acids, including the naphthalene 1, 5-, and 2,6- and 2,7-dicarboxylic acids, 4,41-diphenylene-dicarboxylic acid, ethylene-bis-p. benzoic acid and the like.

Examples of glycols are: ethylene glycol, diethylene glycol, 1,3-trimethylene glycol, 1,4-tetramethylene glycol, 1,6-hexamethylene glycol, 1,8-octamethylene glycol, 2,2-dimethyl-1,3-propane diol and cyclohexane dimethanol. The acids and glycols can be employed alone or in admixture thereof.

The aliphatic dicarboxylic acids to be optionally used in substitution of the aromatic acids in an amount up to the above reported value, are: adipic acid, glutaric acid, sebacic acid, azelaic acid, dodecandioic acid or 1,4-cyclohexane-dicarboxylic acid.

Polyethylene terephthalate, having an intrinsic viscosity of at least 0.3 dl/g and preferably comprised between 0.5 and 1.1 dl/g and an amount of diethylene glycol of at least 0.5% by weight and preferably comprised between 0.8 and 5% by weight, is preferred in the compositions of the present invention. The intrinsic viscosity is measured at 25° C. in a solution containing 8 grams of polymer into 100 ml of orthochlorophenol, according to the standard method ASTM D 2857.

The component B of the composition of the present invention is a salt of a mono- or poly-carboxylic acid containing from 7 to 25 carbon atoms. The salts are preferably those of the metals of Groups I and II in the Periodic Table. Examples of mono- or poly-carboxylic acids include: caprylic acid, lauric acid, mirystic acid, stearic acid, benzoic acid, terephthalic acid, isophthalic acid, 1,8-naphthalene acid and the like. Generally, salts of sodium, potassium, lithium, and calcium of these acids, also in mixture among them, are used.

The use of sodium or potassium benzoate is preferred in the compositions of the present invention.

These salts are preferably used in a pulverized form having an average particle size of below 10 micrometers, preferably comprised between 1 and 5 micrometers.

Some PET compositions containing the above mentioned salts are described in Japan patent No. 71/29977 and in German patent No. 2,014,770.

The ionomer copolymer containing pendant carboxylic groups which are at least partially salified, and constituting component C of the composition of the present invention, can be a copolymer of an alpha-olefin with an alpha-beta unsaturated dicarboxylic acid wherein at least some of the carboxylic groups are neutralized with a metal selected from Group I to Group III in the Periodic Table.

These copolymers may be prepared according to the process described, for example, in Canadian Patent 674,595.

Suitable ionomer copolymers are those having general formula:

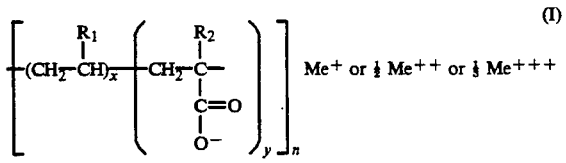

wherein:
$R_1$ represents hydrogen, an alkyl radical containing from 1 to 12 carbon atoms or a phenyl radical; $R_2$ represents hydrogen or a methyl or ethyl radical; x, y and n are each independently an integer; $Me^+$ represents a metal ion of the first Group, $Me^{++}$ a metal ion of the second Group and $Me^{+++}$ a metal ion of the third Group in the Periodic Table.

Polyester compositions containing these ionomer copolymers are described, for example, in U.S. Pat. Nos. 3,435,093 and 3,639,527.

Examples of copolymers having the above reported formula (1) comprise those copolymers wherein the alpha-olefin is ethylene, propylene, butene-1 or pentene 1 and the alpha-beta unsaturated dicarboxylic acid is selected from acrylic acid, itaconic acid, maleic acid, fumaric acid and relevant alkyl esters. Other comonomers, of course, can be terpolymerized in the copolymer of formula (1).

The carboxylic groups are "randomly" distributed in the copolymer and their quantity is, preferably, relatively small. In fact, the preferred ionomer copolymers are those having an olefin content of at least 50% and preferably from 80 to 99% weight.

The carboxyl groups of the ionomer copolymers need not always be all neutralized by the metal ions, but at least 10% and preferably at least 30% of the carboxyl groups should be neutralized by metal ions appertaining to from Group I to Group III in the Periodic Table. The neutralization of the pendant carboxyl groups can be also complete.

The suitable metal ions are those of sodium, potassium, lithium, calcium, magnesium or aluminum; sodium or potassium ions are preferred.

The molecular weight of the ionomer copolymer is not critical and, generally, it is comprised between 5,000 and 50,000.

An ionomer copolymer particularly preferred in the compositions of the present invention is the copolymer constituted by ethylene and methacrylic acid in the ratio 85:15, wherein from 50 to 85% of the acid groups are neutralized by sodium or potassium ions. This copolymer is available on the market and it is produced and sold by E. I. Du Pont De Nemours Company with the trade Mark SURLYN ®.

The ionomer polymer C containing pendant carboxyl groups can be also produced by grafting an alpha-beta unsaturated acid on to a polymeric chain of an alpha-olefin.

The inert inorganic substance D, which is added to the composition of the present invention, can be: calcium carbonate, talc, calcium sulphate, magnesium oxide, titanium dioxide, carbon black, pyrophyllite, boron nitride etc. Talc is particularly preferred.

The particle sizes of these inorganic substances should be less than 5 micrometers and preferably not higher than 2.5 micrometers.

In addition to the components B, C and D discussed hereinabove, the compositions of the present invention may contain conventional additives commonly employed with polyester resins to improve the photo- and thermostability characteristics and other additives such as pigments, colorants, mold release agents, flame retarding agents, rubbers to impart impact resistant properties, additives which improve physical properties, such as toughness and elongation and so on, in amounts of from 0.1 to 5% by weight.

The compositions of the present invention can be prepared by blending the components together by any conventional means. Neither temperature nor pressure are critical for the preparation of these compositions. For example, the linear saturated polyester can be dry mixed in any suitable blender or tumbler with components B, C and D; the mixture thus obtained is then melt-extruded. The extrudate can be chopped and mixed with the reinforcing agent and then the obtained mixture again melt extruded. More conveniently, all the components of the composition, including the reinforcing agent, can be mixed in any suitable blender or tumbler at room temperature and the mixture then melt-extruded.

For the extrusion, any known extrusion unit such as mono-screw or bi-screw extruders, Banbury blenders, mixing rolls and the like can be employed, at a temperature comprised between 250° C. and 300° C.

The above mentioned components B, C and D of the composition of the present invention may be added to the polyester before or during the polymerization process of this resin.

By this method, it is advisable to carry out the polymerization in a suitable way, especially during the polycondensation phase, in the melt state.

The single components B, C and D may be also separately added to the polyester at different steps of the preparation of the compositions of the present invention.

The compositions of the present invention can be used for manufacturing various molded articles by injection or extrusion moulding technologies and, particularly, automotive parts, parts for electric devices and the like.

In order to better illustrate the present invention and to reduce it to practice, a few illustrative examples are given hereinafter, which however are not limitative of the present invention.

EXAMPLES 1-12

In all examples the following procedure was employed for producing the compositions:
polyethylene terephthalate (PET) having an intrinsic viscosity of 0.65 dl/g (measured at 25° C. in a solution containing 8 g of the polymer in 100 ml of ortho-chlorophenol, according to the standard method ASTM D 2857) and a content of copolymerized diethyleneglycol of 2.2% by weight, was previously dried for 12 hours under vacuum at 140° C. in order to reduce the content of the residual water to about 150 ppm. The PET was mixed, in a dry blender, with the components and in the amounts listed in Table I.

The obtained mixtures were then extruded through a two-screw extruder ZCM 41/46 of Soc. AUTOMATIC provided with screws having a variable diameter of 41 and 46 mm; the temperature of the melt was 270° C.

Glass fibers having a diameter of 10 micrometers and a length of 4.25 mm were added in the terminal portion of the extruder for the production of reinforced compositions.

The extrudate in the form of strands was cooled in water and cut in granules which were then dried at 140° C. for about 12 hours and molded by a melt polymer injection molder BMB 65 MC at a temperature of about 275° C. The molding cycle was 42 seconds. The mold temperature, water cooled, is listed in Table I.

Trapezoidal boxes having a rectangular bottom as illustrated in FIGS. 1, 2, 3 and 4 of the enclosed drawing, were molded. In the drawing.

Figure 1:
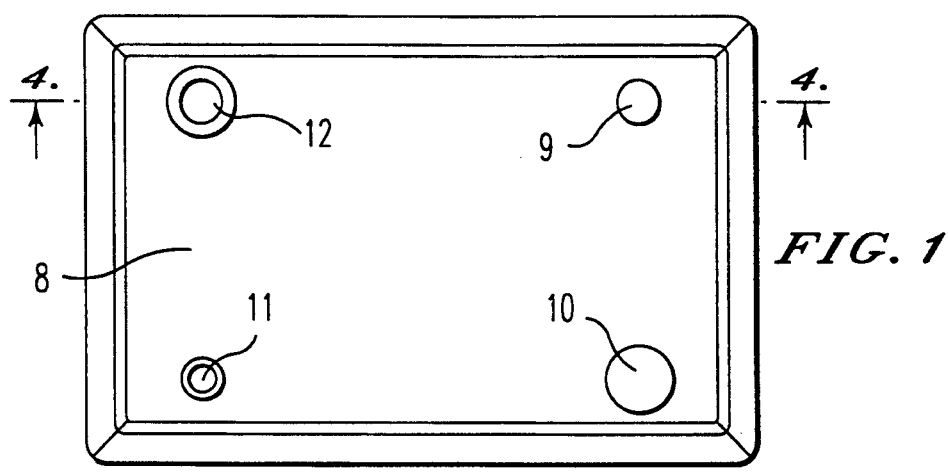
FIG. 1 represents the schematical view from the bottom of the box.
Figure 2:
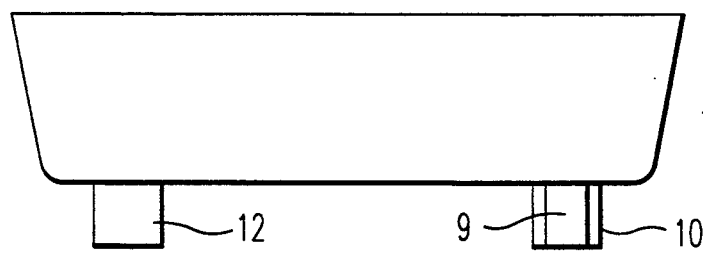
FIG. 2 represents the side schematical view of the box.
Figure 3:
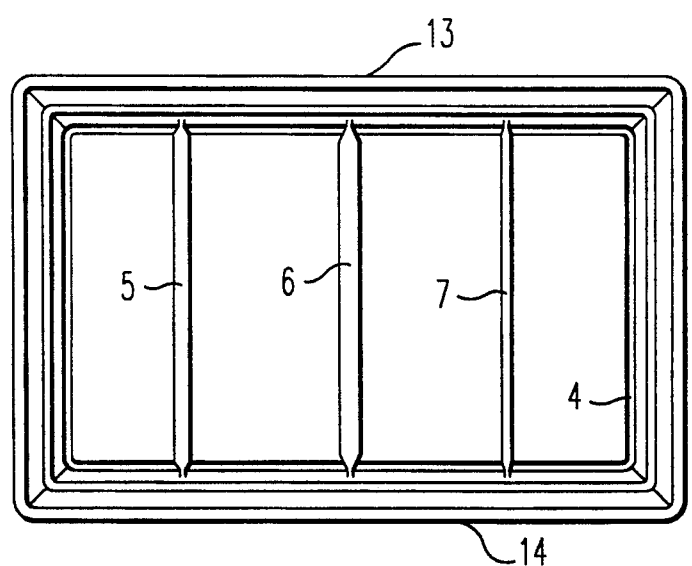
FIG. 3 represents the schematical view from the upper part of the box.
Figure 4:
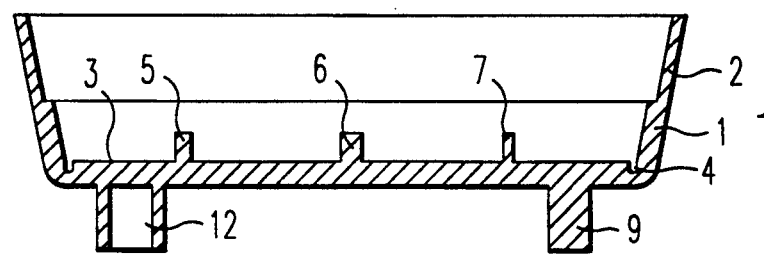
FIG. 4 represents the schematical view of the cross-section obtained by a plane passing through the line 4—4 of FIG. 1.

The dimensions of the box were:
Height: 40 mm.

| Dimensions of the bottom: | |
|---|---|
| length: | 105 mm |
| width: | 62 mm |
| thickness: | 3 mm |
| Dimension of the upper part: | |
| width: | 80.5 mm |
| length: | 120 mm |

The side walls were constituted by a lower part (1), in contact with the bottom, having a height of 15 mm and a thickness of 2 mm and by a higher part (2) having a height of 15 mm and a thickness of 1 mm.

The inner surface (3) of the bottom of the box was provided with perimetric grooves (4), having a depth of 1 mm and a width of 1 mm, and with three ribs (5, 6, 7) having a thickness of 2 mm, 3 mm and 1 mm respectively, an equal height of 5 mm and a length of 62 mm.

One (6) of the three ribs was arranged in the central part of the bottom and the other two ribs (5) and (7) in simmetrical positions at a distance of 30 mm from the central rib (6).

The external surface (8) of the bottom of the box was provided, at the four corners, with foots (9, 10, 11, 12) having a circular cross-section and all the same height of 10 mm.

One (9) of the foots was solid and had a diameter of 6 mm; the second foot (10) was solid and had a diameter of 10 mm; the third foot (11) was tubular with an external diameter of 6 mm and an inner diameter of 4 mm, and, finally, the fourth foot (12) was tubular with an external diameter of 10 mm and an inner diameter of 6 mm.

For evaluating the characteristics of the compositions the following methods were used.

Evaluation of the crystallization index

Thermal analysis were carried out on a rectangular small sample having a thickness of 1.6 mm by a Mod. 9900 E. I. Du Pont De Nemours differential scanning calorimeter.

The crystallization heat on heating ($\Delta Hch$), with its peak temperature (Tch), and, when in the melt state, the crystallization heat on cooling from the melt state ($\Delta Hcc$) with its maximum temperature (Tcc) were determined.

The evaluation of the crystallization index was made according to the formula:

$$\frac{\Delta Hcc - \Delta Hch}{\Delta Hcc} \times 100$$

Mechanical properties

The tensile strength and the elongation at break according to the standard method ASTM D 638; the elastic modulus according to the standard method ASTM D 790 and the IZOD notched impact strength at 23° C. according to the standard method ASTM D 256 were determined, on test pieces having a thickness of 3.2 mm.

Thermal properties

The heat distortion temperature (HDT) was determined according to the standard method ASTM D 648.

Box distortion

The box distortion was determined by measuring the distance (F), expressed in mm, between two median opposite points (13, 14) of the upper part of the longer walls and by using the formula:

$$\text{Distortion} = \frac{F - 80.5}{80.5} \times 100$$

Surface appearance of the moulded boxes was determined by measuring the Gloss, at an angle 60°, on a rectangular plate having sides 125×125×3.2 mm by using a Reflektometer R B 60° of the Society DR. LANGE-Berlin, according to the standard method ASTM 2457.

The characteristics of the compositions are listed in the following Table I.

TABLE I

| COMPOSITION | UNITS | EXAMPLE No. | | | | | | | | | | | |
|---|---|---|---|---|---|---|---|---|---|---|---|---|---|
| | | 1* | 2* | 3* | 4* | 5 | 6 | 7* | 8* | 9* | 10* | 11 | 12 |
| Polyethylene terephthalate | pp(1) | 100 | 100 | 100 | 100 | 100 | 100 | 100 | 100 | 100 | 100 | 100 | 100 |
| Sodium benzoate | pp(1) | 0.3 | | 0.3 | 0.3 | 0.3 | 0.3 | 0.3 | | 0.3 | 0.3 | 0.3 | 0.3 |
| Ethylene/methacrylic acid (85/15) at 60% Na neutralized | pp(1) | | 6.4 | 6.4 | 6.4 | 6.4 | 6.4 | | 6.4 | 6.4 | 6.4 | 6.4 | 6.4 |
| Talc (size = 2.5 μm) | pp(1) | | | | | 0.2 | 0.2 | | | | | 0.2 | 0.2 |
| Glass Fiber | pp(1) | | | | 46 | | 46 | | | | 46 | | 46 |

TABLE I-continued

| COMPOSITION | UNITS | 1* | 2* | 3* | 4* | 5 | 6 | 7* | 8* | 9* | 10* | 11 | 12 |
|---|---|---|---|---|---|---|---|---|---|---|---|---|---|
| MOULD TEMPERATURE | | 50° C. | 50° C. | 50° C. | 50° C. | 50° C. | 50° C. | 85° C. | 85° C. | 85° C. | 85° C. | 85° C. | 85° C. |
| CRYSTALLIZATION | | | | | | | | | | | | | |
| Index | % | 86.5 | 58.1 | 76.1 | 87 | 81.8 | 87.8 | 91.8 | 69.3 | 87.9 | 94.8 | 92.7 | 96.1 |
| ΔHch | J | 5.3 | 12.8 | 4.3 | 2.3 | 5.2 | 3.1 | 3.2 | 8.8 | 3.6 | 1.2 | 1.9 | 0.7 |
| ΔHcc | J | 39.5 | 30.6 | 18.2 | 18 | 28.7 | 25.3 | 38.7 | 28.8 | 29.6 | 23.5 | 26.5 | 18.8 |
| Tch | °C. | 122.5 | 124.1 | 124.5 | 119.7 | 119.0 | 119.0 | 121.2 | 120.0 | 119.7 | 118.4 | 118.3 | 119.1 |
| Tcc | °C. | 212.8 | 212.9 | 213.8 | 216.0 | 219.1 | 216.5 | 215.2 | 212.9 | 213.7 | 216.5 | 218.1 | 216.1 |
| MECHANICAL PROPERTIES | | | | | | | | | | | | | |
| Tensile Strength | MPa | 56 | 50 | 56 | 146 | 57 | 148 | 45 | 58 | 63 | 150 | 56 | 148 |
| Elongation at break | % | 2.6 | 45 | 44.5 | 3.0 | 3.8 | 3.1 | 1.8 | 96.3 | 5.5 | 3.1 | 3.0 | 3.0 |
| Elastic Modulus | MPa | 716 | 1102 | 1299 | 10847 | 1381 | 10722 | 809 | 1284 | 1366 | 10522 | 1361 | 10917 |
| IZOD | J/m | 15 | 37 | 30 | 93 | 30 | 98 | 14 | 37 | 37 | 96 | 31 | 97 |
| THERMAL PROPERTIES | | | | | | | | | | | | | |
| HDT | °C. | 60 | 54 | 57 | 218 | 59 | 218 | 60 | 62 | 64 | 218 | 65 | 218 |
| DISTORTION | % | 4 | 5 | 2 | 2 | 0 | 0 | 8 | 6 | 2.5 | 2.5 | 1 | 1 |
| GLOSS: | | | | | | | | | | | | | |
| Highest | % | 90 | 89 | 89 | 42 | 90 | 50 | 88 | 57 | 76 | 35 | 82 | 43 |
| Lowest | % | 85 | 83 | 85 | 35 | 84 | 40 | 80 | 51 | 70 | 28 | 77 | 32 |

(1)pp = parts by weight
*Comparison tests

EXAMPLES 13-18

The operative modalities of example 1 were repeated by using polyethyleneterephthalate having an intrinsic viscosity of 0.65 dl/g, measured as described in example 1, a water content of about 150 ppm and containing 0.9% by weight of diethylene glycol copolymerized therein.

The characteristics of the obtained compositions are listed in the following Table II.

TABLE II

| COMPOSITION | UNITS | 13* | 14* | 15 | 16 | 17 | 18 |
|---|---|---|---|---|---|---|---|
| Polyethylene terephthalate | pp(1) | 100 | 100 | 100 | 100 | 100 | 100 |
| Sodium benzoate | pp(1) | | | 0.3 | 0.3 | 0.3 | 0.3 |
| Ethylene/methacrylic acid (85/15) copolymer at 60% Na neutralized | pp(1) | 6.4 | 6.4 | 6.4 | 6.4 | 6.4 | 6.4 |
| Talc (size = 2.5 μm) | pp(1) | | | 0.2 | 0.2 | 0.2 | 0.2 |
| Glass Fiber | pp(1) | 46 | 46 | | | 46 | 46 |
| MOULD TEMPERATURE | | 50° C. | 85° C. | 50° C. | 85° C. | 50° C. | 85° C. |
| CRYSTALLIZATION | | | | | | | |
| Index | % | 79.9 | 93.7 | 94.3 | 96.5 | 86.3 | 96.8 |
| ΔHch | J | 6.6 | 2.0 | 1.7 | 1.0 | 2.9 | 0.7 |
| ΔHcc | J | 32.7 | 32.1 | 29.7 | 29.7 | 21 | 21.5 |
| Tch | °C. | 124.4 | 122.2 | 121.0 | 122.1 | 121.6 | 119.0 |
| Tcc | °C. | 221.0 | 221.4 | 224.9 | 224.6 | 221.8 | 222.9 |
| MECHANICAL PROPERTIES | | | | | | | |
| Tensile strength | MPa | 140 | 147 | 62 | 60 | 145 | 144 |
| Elongation at break | % | 3.2 | 3.0 | 3.7 | 3.7 | 3.0 | 2.8 |
| Elastic Modulus | MPa | 10130 | 10510 | 1434 | 1459 | 10411 | 10124 |
| IZOD | J/m | 108 | 105 | 39 | 37 | 103 | 98 |
| THERMAL PROPERTIES | | | | | | | |
| HDT | °C. | 222 | 222 | 62 | 67 | 225 | 225 |
| DISTORTION | % | 2 | 2.5 | 0.5 | 1.0 | 0 | 1 |
| GLOSS: | | | | | | | |
| highest | % | 21 | 14 | 91 | 84 | 48 | 41 |
| lowest | % | 12 | 9 | 88 | 80 | 39 | 32 |

(1)pp = parts by weight
*Comparison tests

We claim:

1. Molding compositions based on linear saturated polyester having high crystallization rate and suitable for being molded at a temperature of the mold not higher than 100° C. to manufacture molded articles having an optimal combination of mechanical, physical and thermal properties and of surface appearance, characterized in that they comprise:

A. a linear saturated polyester having an intrinsic viscosity of at least 0.3 dl/g;

characterized in that they contain, incorporated in the polyester resin (A), from 0.1 to 5% by weight, with respect to polyester (A), of a salt of a mono- or poly-carboxylic acid (B), from 1 to 20% by weight, with respect to polyester (A), of an ionomer copolymer (C) containing pendant carboxylic groups which are at least partially salified and from 0.01 to 1% by weight, with respect to polyester (A), of a solid inert inorganic substance (D) having a particle size not greater than 5 micrometers.

2. Molding compositions according to claim 1, char-

B. from 0.5 to 2% by weight, with respect to polyester A, of a salt of a mono- or poly-carboxylic acid containing from 7 to 25 carbon atoms;

C. from 2 to 10% by weight, with respect to polyester A, of an ionomer polymer containing pendant carboxyl groups which are at least partially salified; and D. from 0.01 to 1% by weight, with respect to polyester A, of a solid inert inorganic substance having particle size not higher than 2.5 micrometers.

3. Molding compositions according to claim 1, characterized in that they contain, in addition, a reinforcing material selected from glass fibers, asbestos fibers, carbon fibers, crystalline aromatic polyamide fibers or high modulus acrylic fibers, in a concentration of between 0.1 and 150%.

4. Molding compositions according to claim 3, wherein the reinforcing material is constituted by glass fibers having a length comprised between 0.05 and 5 cm and a diameter comprised between 5 and 50 micrometers.

5. Molding compositions according to claim 1, wherein the linear saturated polyester is polyethylene terephthalate having an intrinsic viscosity of at least 0.3 dl/g, and an amount of diethylene glycol of at least 0.5% by weight.

6. Molding compositions according to claim 1, wherein the mono- or poly carboxylic acid (B) contains from 7 to 25 carbon atoms and is salified by a metal of Groups I and II of the Periodic Table.

7. Molding compositions according to claim 6, wherein the salt of a mono- or poly-carboxylic acid (B) is sodium or potassium benzoate.

8. Molding compositions according to claim 1, wherein the salt of a mono- or poly carboxylic acid (B) is in a pulverized form having an overall particle size of below 10 micrometers.

9. Molding compositions according to claim 1, wherein the ionomer component (C) is a copolymer of an alpha-olefin with an alpha-beta unsaturated dicarboxylic acid wherein at least some of the carboxylic groups are neutralized with a metal selected from Group I to Group III of the Periodic Table.

10. Molding compositions according to claim 9, wherein component (C) has general formula:

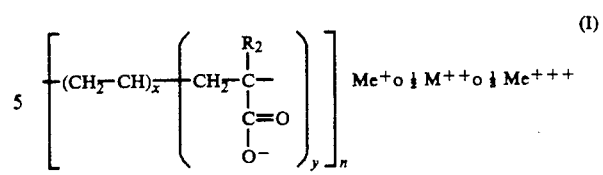

wherein:
$R_1$ represents hydrogen, an alkyl radical containing from 1 to 12 carbon atoms or a phenyl radical; $R_2$ represents hydrogen or a methyl or ethyl radical; x, y and n are each independently an integer; $Me^+$ represents a metal ion of the first Group, $Me^{++}$ a metal ion of the second Group and $Me^{+++}$ a metal ion of the third Group in the Periodic Table.

11. Molding compositions according to claim 9, wherein component (C) is a copolymer of an alpha-olefin with an alpha-beta unsaturated dicarboxylic acid having a molecular weight ranging from 5,000 to 50,000, an olefin content of at least 50%, and at least 10% of the carboxyl groups are neutralized by metal ions selected from Group I to Group III of the Periodic Table.

12. Molding compositions according to claim 9, wherein the metal ions are selected from sodium, potassium, lithium, calcium, zinc, barium, magnesium or aluminum ions.

13. Molding compositions according to claim 9, wherein the ionomer copolymer is constituted by ethylene and methacrylic acid in the ratio 85:15, wherein from 50 to 85% of the acid groups are neutralized by sodium or potassium ions.

14. Molding compositions according to claim 1, wherein the inert inorganic substance (D) is selected from calcium carbonate, talc, calcium sulphate, magnesium oxide, titanium dioxide, carbon black, pyrophyllite or boron nitride.

15. Molding compositions according to claim 1, containing, in addition from 0.01 to 5% by weight of conventional additives employed with polyester resins to improve the photo- and thermostability characteristics, pigments, colorants, mold release agents, flame retarding agents, rubbers to impart impact resistant properties, and additives which improve toughness and elongation.

16. Molding composition according to claim 1, wherein
(A) is polyethylene terephthalate,
(B) is sodium benzoate,
(C) is ethylene/methacrylic acid (85/15) copolymer 60% Na neutralized, and
(D) is talc having a particle size of 2.5 micrometers.

* * * * *